United States Patent [19]
Andela et al.

[11] Patent Number: 5,620,101
[45] Date of Patent: Apr. 15, 1997

[54] TROMMEL SEPARATOR CLUTCH MECHANISM AND SYSTEM

[75] Inventors: Cynthia Andela; James Andela, both of Richfield Springs, N.Y.

[73] Assignee: Andela Tool and Machine, Inc., Richfield Springs, N.Y.

[21] Appl. No.: 349,939

[22] Filed: Dec. 6, 1994

[51] Int. Cl.$^6$ .................................................. B07B 1/42
[52] U.S. Cl. ........................................ 209/288; 209/369
[58] Field of Search .................................... 209/288, 369, 209/404, 406, 412, 413

[56] References Cited

U.S. PATENT DOCUMENTS

| | | |
|---|---|---|
| 3,749,004 | 7/1973 | Pagdin et al. . |
| 3,812,967 | 5/1974 | Rudzinski . |
| 3,827,351 | 8/1974 | Rosenow . |
| 4,030,606 | 6/1977 | Smith et al. ......................... 209/369 X |
| 4,128,154 | 12/1978 | Voegelin . |
| 4,313,823 | 2/1982 | Locker ..................................... 209/369 |
| 4,342,396 | 8/1982 | Fagnant et al. . |
| 4,346,850 | 8/1982 | Westergaard . |
| 4,440,637 | 4/1984 | Smit et al. ........................... 209/369 X |
| 4,469,230 | 9/1984 | Gorlitz et al. ....................... 209/369 X |
| 4,619,407 | 10/1986 | Goldhammer . |
| 4,619,409 | 10/1986 | Harper et al. . |
| 4,786,000 | 11/1988 | Weil et al. . |
| 4,919,345 | 4/1990 | Burlington et al. . |
| 5,184,781 | 2/1993 | Andela . |
| 5,248,100 | 9/1993 | Arakawa . |

*Primary Examiner*—D. Glenn Dayoan
*Attorney, Agent, or Firm*—Michael de Angeli

[57] ABSTRACT

A trommel separator includes a clutch mechanism that operates with a shaft mounted right angle gear reducer for direct drive of the drum and a flexible mount. The clutch mechanism has a clutch slip disk which is located between first and second disks. The first disk receives the torque from the shaft mounted gear reducer which is then transferred to the second disk, which is rigidly connected to a rotating drum, when the first and second disk are pulled together. A clutch regulating system, namely jam nuts and a spring coil, are connected to the first and second disks through shafts for pulling the first disk and the second disk together. The flexible mount has a mount which rests upon a pivot plate for rotating the mount around a vertical axis. A first and second plate is attached to the gear reducer and horizontally rotatable within the mount. Clips keep the mount from lifting off a frame and spacers prevent the clamping of the mount. Pads are also used to prevent wear of the clips.

5 Claims, 3 Drawing Sheets

TROMMEL SEPARATOR CLUTCH MECHANISM AND SYSTEM

FIELD OF THE INVENTION

The present invention relates to a recycling system and rotary separators which may be used in a recycling system, and, more particularly, to a rotary trommel separator with a clutch mechanism and flexible mount which may be used in a recycling system or the like.

BACKGROUND OF THE INVENTION

Trommel separators are used in the recycling industry for separating and classifying particles of diverse sizes. Rotary trommel separators, and any other such machine that can potentially handle large, bulky objects, often deals with the problem of jamming and ultimately the overloading of the motor. Steps have been taken to overcome this dilemma as illustrated in the following patents:

U.S. Pat. No. 4,619,407 to Goldhammer discloses a method for operating a shredding machine, which works via at least one drive train on cutter blocks of the shredding machine and which can be switched over into reverse to run automatically upon an overloading of the shredding machine.

U.S. Pat. No. 4,619,409 to Harper et al. shows a system for disposing of large amounts of waste materials whereas means are provided to monitor the unit and to take quick action to clear an overload condition therein or, if necessary, to shut down the system before serious damage results.

U.S. Pat. No. 4,786,000 to Weil et al. discusses a crushing apparatus comprising a bottle breaking member including a plate, and a punch extending outwardly from that plate. A V-shaped wall supports the bottle. If the crushing apparatus becomes jammed, the operator pushes the clear button which causes the bottle breaking members to reciprocate at a relatively low frequency.

U.S. Pat. No. 4,919,345 to Burlington et al. illustrates a shredding machine having oppositely rotating cutter shafts driven by an electric motor through an epicyclic gear mechanism. One of the shafts is driven directly, and the other through further gearing. The casing is mounted for limited movement under high load, a switch being provided to detect such movement, to stop or reverse the motor.

U.S. Pat. No. 5,248,100 to Arakawa discloses a rotor shearing type crusher for crushing waste. Any foreign material impossible to be crushed is separately discharged.

U.S. Pat. No. 3,812,967 to Rudzinski shows comminuting and screening apparatus for use in a rectangular liquid flow channel which may carry sewage or other fluid having solids which must be comminuted or removed. The cutting edges of the bits are angled such that hard solids tend to be rejected or pushed out of contact with the cutters to minimize sudden shock on the cutters and possible jamming of the rotor.

U.S. Pat. No. 3,749,004 to Pagdin et al. shows an apparatus for crushing having pairs of opposing crushing rollers. On roller from each set of rollers is rotatably supported by a frame. The other roller from each set of rollers is rotatably supported by a member movable relative to the frame.

U.S. Pat. No. 3,827,351 to Rosenow illustrates an apparatus for flattening metal cans and crushing lass containers. One of the rollers is mounted on a spring-biased yoke member to prevent jamming of the apparatus by a foreign noncrushable object which may enter the apparatus.

U.S. Pat. No. 4,346,850 to Westergaard discloses a shredding machine using a torque cushioning assembly. When a torque overload is applied to the comminuting shafts, a reaction is produced which tends to rotate the transmission casing relative to the frame. This rotation is resiliently resisted by the springs to cushion the impact on the teeth.

U.S. Pat. No. 4,128,154 to Voegein shows a positive engagement clutch to provide accurate alignment of intermittently operating cylinders with respect to the angular position of the machine drive shaft.

U.S. Pat. No. 4,342,396 to Fagnant et al. discloses a rotary parts separator. Small parts are separated from a mixture with larger members through rotation of a conical rotor mounted co-axially in a baffle. A friction clutch is mounted on the motor shaft which affords specific overload protection.

The above prior art summaries are merely representative of portions of the inventions disclosed in each reference. In no instance should these summaries substitute for a thorough reading of each individual reference. All the above references are hereby incorporated by reference.

In the recycling industry, operating conditions are usually very dirty, abrasive and very hard on the recycling equipment. Not only must the motor be protected from overload, but the power/gear unit should be totally enclosed. Gearing for several of the aforementioned patents was constructed externally, which would thereby expose and adversely affect the gears, roller chains and other power transmission components to airborne contaminants like glass dust, dirt, or other abrasive matter.

Gearing that was constructed internally, such as in U.S. Pat. No. 4,342,396, allowed for an effective clutch system which, in general, prevented overloading of the motor, but did not allow for specific adjustment of torque thereof being applied to the drum, nor the control of the amount of slippage thereto.

Furthermore, most mounts in the aforementioned patents were either unmovable, whereas the axial and radial inaccuracies of the shaft or rotating drum caused by manufacturing tolerances, wear or design, would destroy the mount and frame in a very short time; or designed to monitor slight movements in order to immediately turn off the motor in case of jamming, etc., thus causing unnecessary delays and repairs.

SUMMARY OF THE INVENTION

In order to avoid the disadvantages of the prior art, the present invention provides a trommel separator with a clutch mechanism that operates with a shaft mounted right angle gear reducer for direct drive of the drum and flexible mount. The rotary trommel separator may be used in a recycling system or the like.

The clutch mechanism has a clutch slip disk which is located between first and second disks. The first disk receives the torque from the shaft mounted gear reducer which is then transferred to the second disk, which is rigidly connected to a rotating drum, when the first and second disk are pulled together.

A clutch regulating system, namely jam nuts and a spring coil, are connected to the first and second disks through shafts for pulling the first disk and the second disk together.

The clutch mechanism transmits the torque from the shaft mounted gear reducer to the drum of the trommel separator such that the starting and stopping torque can overcome the friction of the clutch and permit slippage in the event that the drum should become jammed such that it cannot rotate. This clutch mechanism protects the mount from absorbing the full torque of the gear reducer during starts and stops and in the event that the drum becomes jammed. The amount of torque transfer and/or the desired slippage is easily controlled by accessible jam nuts.

The flexible mount consists of a mount which rests upon a pivot plate for rotating the mount around a vertical axis. A first and second plates are attached to the gear reducer and horizontally rotatable within said mount. Clips keep the mount from lifting off a frame and spacers prevent the clamping of the mount. Pads are also used to prevent wear of the clips.

The flexible mount is a floating mechanism which compensates for shaft deflection when there is axial and radial inaccuracy of the shaft or rotating drum caused by manufacturing tolerances, wear or design. Because of this unique characteristic, the mount and frame are protected against conditions that would cause costly repairs and unnecessary delays in the operation.

Together, this flexible mount and clutch mechanism permit the use of a totally enclosed power/gear unit without the necessity of exposed gears, roller chains and other power transmission components. This rotating trommel separator is specifically designed for use in the recycling industry where operating conditions are usually very dirty, abrasive and very hard on recycling equipment. The combination flexible mount and clutch mechanisms provide a unique "floating" drive unit that is enclosed, flexible and adaptable to high wear conditions.

The invention also includes a unique rotating drum in which various sizes of particles can be classified and separated by size. The first embodiment to the invention discloses a rotating drum which classifies and separates three sizes of particles. A second embodiment discloses a rotating drum which classifies and separates four different sizes of particles.

BRIEF DESCRIPTION OF THE DRAWINGS

These and other features of the present invention will become readily apparent upon reading the following detailed description and upon reference to the drawings in which.

DETAILED DESCRIPTION OF THE INVENTION

Referring now specifically to the drawings, there is illustrated a trommel separator 10 in accordance with the present invention.

Figure 1:
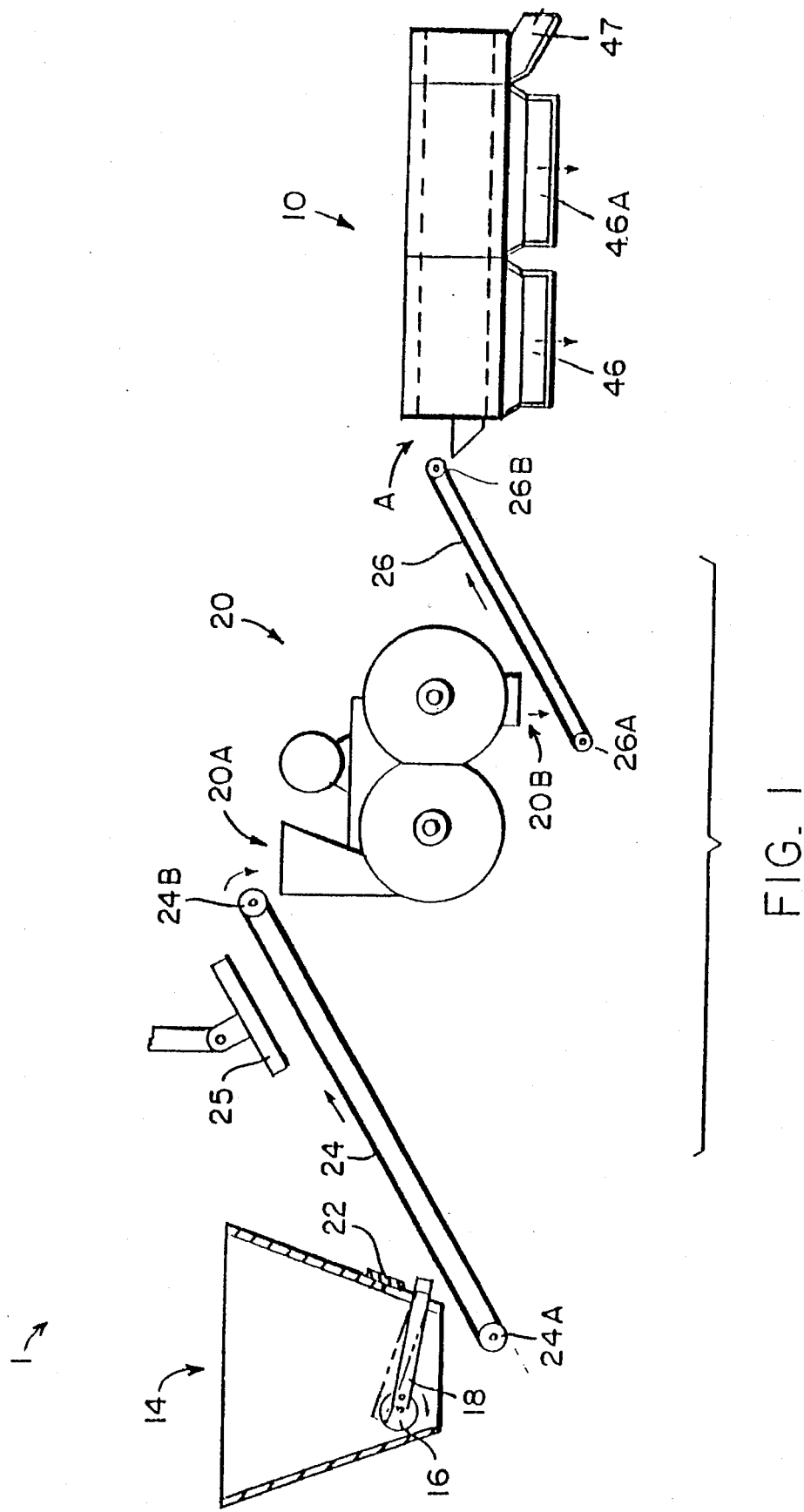
FIG. 1 is a perspective view of a recycling apparatus embodying the present invention.

As can be seen in FIG. 1, the trommel separator 10 is a part of the whole recycling system 1. The recycling system 1 comprises a surge hopper 14, pulverizer 20 and trommel separator 10, with conveyor belts 24 and 26 transporting the recyclable material from one machine to the next.

The surge hopper 14 comprises an unloading mechanism 18 operated by an eccentric drive 16. Recyclable material travels from the surge hopper 14, out the metered door 22, and onto a first conveyor belt 24 with a first end 24A and a second end 24B, wherein the first end 24A is positioned to receive material from the surge hopper 14.

An overhead magnet 25 separates the metallic recyclable material from the non-metallic recyclable material as the recyclable material travels up the first conveyor belt 24. The non-metallic recyclable material is then deposited into the receiving end 20A of the pulverizer 20 from the second end 24B of the first conveyor belt 24. An example of the pulverizer, and arrangements to drive it, is shown in U.S. Pat. No. 5,184,781, by the inventor hereof and incorporated herein by reference.

The pulverized recyclable material is then discharged through the discharge end 20B of the pulverizer 20 and deposited onto a second conveyor belt 26 with a first end 26A and a second end 26B, wherein the first end 26A receives material from the pulverizer 20.

This recyclable material, traveling in the A direction, is then loaded into the trommel separator 10, the trommel separator 10 receiving the material from the second end 26B of the second belt 26. The recyclable material is then classified into three different sizes, which exit through the three hoppers 46, 46A, and 47. An example of the three sizes of material which are classified could consist of, but are not limited to: recyclable material less than one-eighth of an inch which would fall through the hopper 46; recyclable material equal to and between the sizes of one-eighth of an inch and three-eighths of an inch which would exit through hopper 46A; and recyclable material greater than three-eighths of an inch which would be classified as trash and would vacate through hopper 47.

Figure 2:
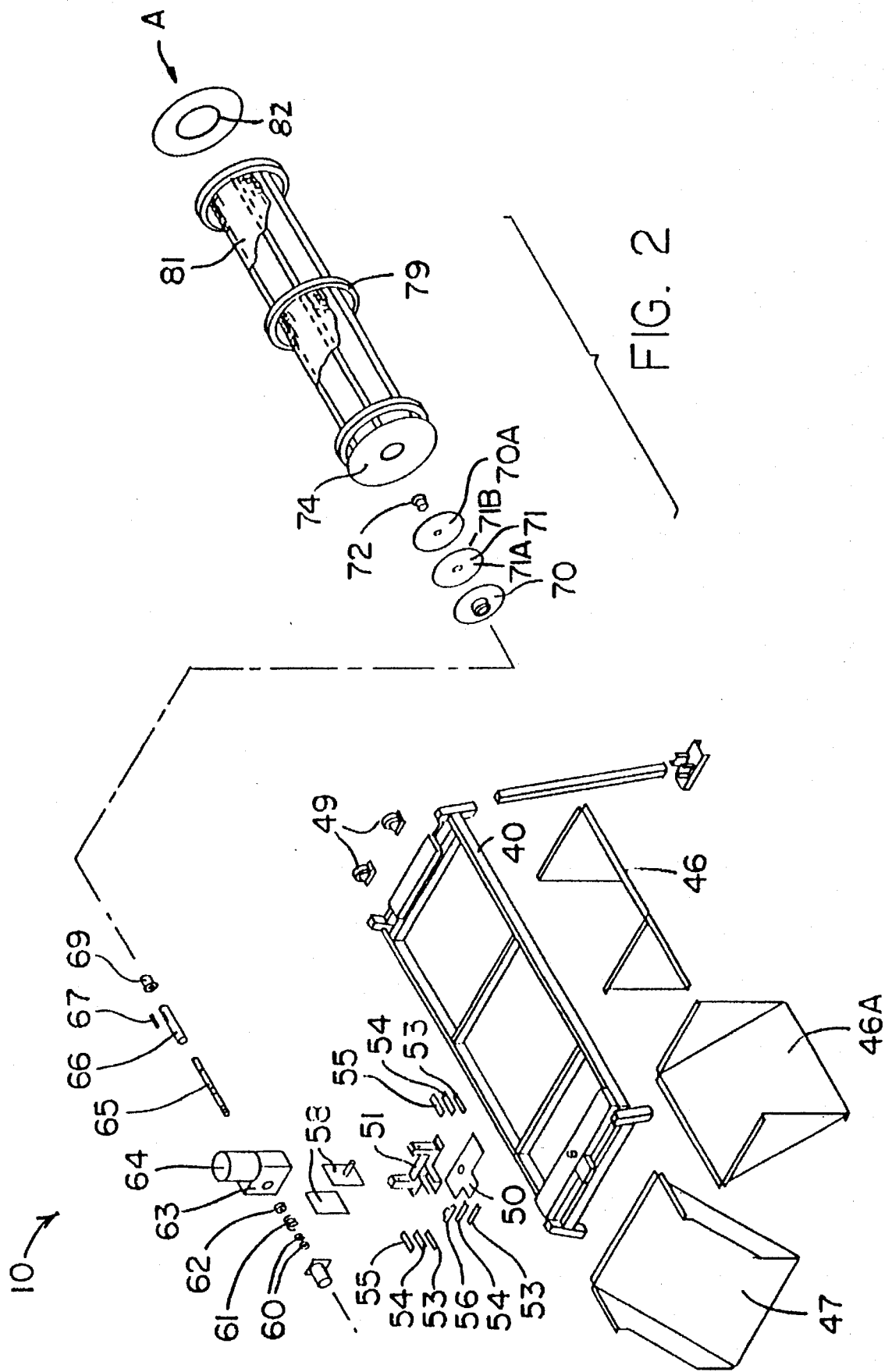
FIG. 2 is a schematic, exploded, perspective view of the trommel separator as set forth in the present invention.

FIG. 2 discloses the specific features of the trommel separator 10. A motor 64 and shaft mounted right angle gear reducer 63 allow for direct drive of a rotating drum 79. A clutch device (60–71) is attached to the motor 64 and gear reducer 63. A rotating drum 79, enclosed by screen 81, has an aperture 82 which allows material to enter the rotating drum 79 in direction A, and end plate 74. A flexible mount apparatus (50–58), is attached to the motor 64 and gear reducer 63. A frame 40 with rotating devices 49 is attached to the flexible mount apparatus. The rotating drum 79 rotates upon frame 40.

The clutch device includes a clutch slip disk 71 having a first side 71A, and a second side 71B. A first disk 70 is operatively connected to the first side 71A of the clutch slip disk 71. A second disk 70A is operatively connected to the second side 71B of the clutch slip disk 71 and rigidly connected to the rotating drum 79. A tapered bushing 72 is pressed into disk 70A. The clutch slip disk is medial the first and second disks.

A shaft drive system is also a component of the clutch device. The shaft drive system includes a hollow shaft 66 which fits inside the gear reducer 63 which is attached to the motor 64. The torque is transferred from the motor 64 to the hollow shaft 66 by means of a key 67 which is attached to the hollow shaft 66. The hollow shaft 66 is attached to a bushing 69 by means of the same key 67. This key is preferably approximately three inches long, but any other suitable length is also within the scope of this invention. The bushing 69 is tapered and pressed into the first disk 70. The power and torque from the motor 64 are transferred via the hollow shaft 66 and key 67 to the first disk 70.

The clutch device also includes a clutch regulating system which is connected to the first disk 70 and second disk 70A for pulling the first disk 70 and second disk 70A together. The clutch regulating system comprises a second shaft 65 which fits through and is keyed into the bushing 72. The second shaft 65 goes through and fits inside of the disks 70A, 71 and 70, bushing 69 and hollow shaft 66. It goes through and extends out of the other end of the gear reducer 63 and motor 64, through the thrust washer 62, and a nest of springs or single coil spring which are part of a spring device 61. Two jam nuts 60 are attached to the end of the second shaft 65. The jam nuts 60 are used to pre-load the spring device 61 which pulls the first disk 70 and second disk 70A together for the transfer of torque from disk 70 to disk 70A and thus to the rotating drum. The two jam nuts 60 also regulate the slippage factor of the clutch slip disk 71.

The clutch mechanism transmits the torque from the shaft mounted gear reducer 63 and motor 64 through the disks 70 and 70A such that starting and stopping torque can overcome the friction of the clutch and permit slippage in any event that the drum should become jammed such that it cannot rotate. This clutch mechanism protects the mount from absorbing the full torque of the gear reducer during starts and stops and in the event that the drum becomes jammed. The amount of torque transfer and/or the desired slippage is easily controlled by the accessible jam nuts 60.

The flexible mount apparatus includes a mount 51 having a bottom surface, first and second trunnion plates 58 which rotate within the mount 51 around a horizontal axis, and a pivot plate 50 attached to the bottom surface of the mount 51. The mount 51 rests on top of the pivot plate 50 and a pivot pin attached to the frame goes up through the plate 50 and into a flange bearing attached to the mount 51 allowing rotation around a vertical axis.

The flexible mount apparatus further includes clips 55 and 56 which go over tabs on the mount 51 in three places and keep the mount 51 from lifting off the frame 40 when it is under torque, spacers 53 which prevent clamping of the mount 51, and pads 54 which prevent wear and galling of the clips 55 and 56. The pivot pad 50 and the pads 54 are made of a self lubricating plastic material.

The flexible mount apparatus is a floating mechanism which compensates for shaft deflection when there is axial and radial inaccuracy of the shaft or rotating drum caused by manufacturing tolerances, wear or design. If this power unit was on a solid mount, these conditions would destroy the mount and frame in a very short time. The shaft mount power/gear unit make the flexible mount possible.

Together, this flexible mount and clutch mechanism along with a totally enclosed power/gear unit eliminate the use of exposed gears, roller chains and other power transmission components which would be adversely affected by airborne contaminants such as glass dust, dirt, or other abrasive matter. This rotating trommel separator is designed for use in the recycling industry where operating conditions are usually very dirty, abrasive and very hard on the recycling equipment. The combination flexible mount and clutch mechanisms provide a unique "floating" drive unit that is enclosed, flexible and adaptable to high wear conditions.

Figure 3:
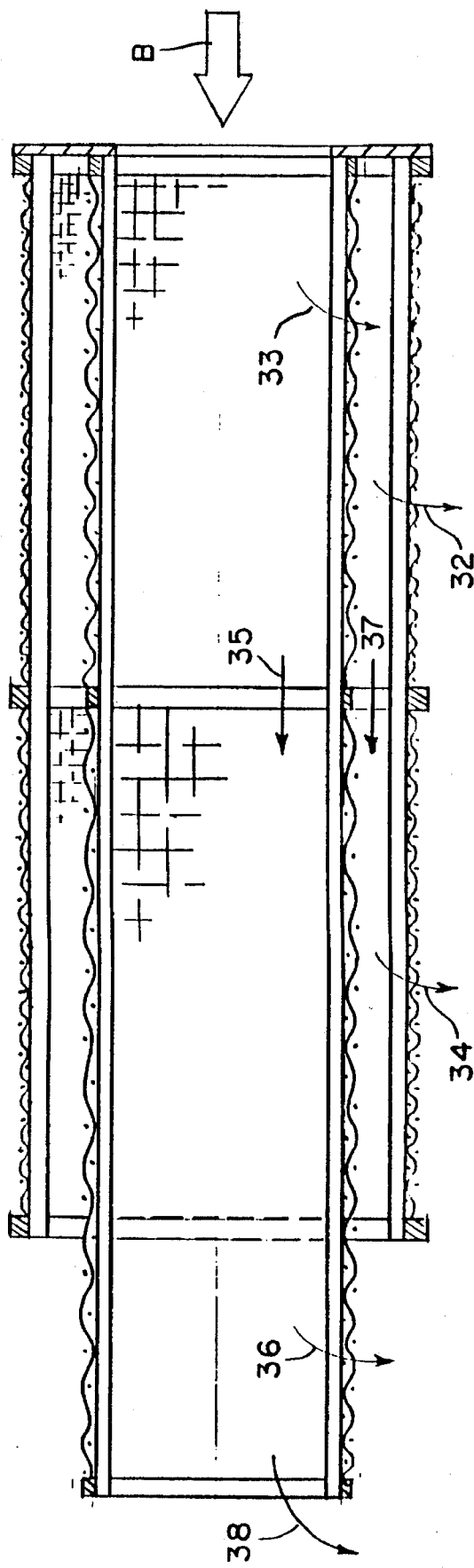
FIG. 3 is a perspective view of a second embodiment of the rotating drum of the trommel separator as set forth in the present invention.

The screens of the rotating drum are shown in more detail in FIG. 3. FIG. 3 is a second embodiment of the present invention, wherein the screens allow for four separate size classifications of material. An example of the four sizes of material and process by which they are classified as they travel in direction B could comprise, but is not limited to: recyclable material less than one-fourth of an inch would fall through screen 33 and then the material less than one-eighth of an inch would exit through screen 32; material equal to and between the sizes of one-eighth of an inch and three-sixteenths of an inch would travel through screen 37 and exit through screen 34; recyclable material greater than or equal to one-fourth of an inch would travel through screen 35 and then the material between the sizes of three-sixteenths of an inch and three-eighths of an inch would exit through screen 36; and recyclable material greater than or equal to three-eighths of an inch which would be classified as trash and would exit through screen 38.

The foregoing description of the preferred embodiments of the invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

I claim:

1. A trommel separator comprising:

a motor;

a clutch device, attached to said motor;

a rotating drum enclosed by a screen having an aperture on one end, said rotating drum attached to said clutch device on a second end opposing said aperture;

a flexible mount apparatus, attached to said motor, including, a mount having a bottom surface;

first and second plates attached to said motor and horizontally rotatable with respect to said mount; and a pivot plate attached to said bottom surface of said mount for rotation of said mount around a vertical axis; and a frame, attached to said flexible mount apparatus, upon which rotates said rotating drum.

2. The trommel separator of claim 1 wherein the clutch device further comprises:

clutch slip disk having a first and second sides;

a first disk operatively connected to said first side of said clutch slip disk;

a second disk operatively connected to said second side of said clutch slip disk and rigidly connected to said rotary screen, whereby said clutch slip disk is medial said first and second disk;

a shaft drive system connected to said motor wherein said shaft system transfers torque from said motor to said first disk;

a clutch regulating system connected to said first and second disks for pulling said first disk and said second disk together for transferring said torque from said first disk to said second disk.

3. The trommel separator of claim 2 wherein said shaft drive system comprises:

a hollow shaft attached to said motor;

a key attached to said hollow shaft for transferring said torque from said motor to said hollow shaft;

a bushing attached to said hollow shaft and to said first disk for transferring said torque from said hollow shaft to said first disk.

4. The trommel separator of claim 3 wherein said clutch regulating system comprises:

a spring device, adjacent to said motor;

first and second jam nuts, adjacent to said spring device;

a second shaft attached to said first and second jam nuts and positioned within said spring device, said motor, said hollow shaft, said first disk, said clutch slip disk and said second disk, whereby said first and second jam nuts preload said spring device to pull said first disk and said second disk together.

5. The trommel separator of claim 1 wherein said flexible mount apparatus further comprises:

a clip attached to said mount for stabilizing said mount;

a spacer attached to said mount and adjacent to said clip for prevention of clamping of said mount;

a pad attached to said clip for preventing wear of said clip.

* * * * *